(12) United States Patent
Wolter

(10) Patent No.: US 6,487,816 B1
(45) Date of Patent: Dec. 3, 2002

(54) STACKABLE SUPPORT FOR BRACING PLANTS AND OTHER SUPPLE ITEMS

(75) Inventor: Robert Wolter, Rowayton, CT (US)

(73) Assignee: Wren Garden Products, Inc., Norwalk, CT (US)

(*) Notice: Subject to any disclaimer, the term of this patent is extended or adjusted under 35 U.S.C. 154(b) by 0 days.

(21) Appl. No.: 09/636,408

(22) Filed: Aug. 10, 2000

(51) Int. Cl.⁷ ............... A01G 17/06; A01G 17/14
(52) U.S. Cl. .................................. 47/47; 47/45
(58) Field of Search ..................... 47/47, 44, 46, 47/45; D8/1; 248/545

(56) References Cited

U.S. PATENT DOCUMENTS 5,179,799 A * 1/1993 Hillestad .................. 47/45
D396,390 S * 7/1998 Edmondson .............. D8/1
D411,722 S * 6/1999 Grimes ..................... D8/1
D428,313 S * 7/2000 Nichols .................... D8/1

* cited by examiner

Primary Examiner—Peter M. Poon
Assistant Examiner—Bethany L. Griles
(74) Attorney, Agent, or Firm—McCormick, Paulding & Huber LLP

(57) ABSTRACT

In a stackable support for bracing plants or other items incapable of self support, an elongated primary member includes first and second ends. At least one retaining arm extends from the primary member adjacent to the second end and is adapted to engage and brace said plants or other supple items. Successive stackable supports are capable of being mounted one on top of the other to accommodate larger or growing plants, or other supple items.

9 Claims, 3 Drawing Sheets

STACKABLE SUPPORT FOR BRACING
PLANTS AND OTHER SUPPLE ITEMS

FIELD OF THE INVENTION

The present invention is generally directed to apparatus for buttressing plants and other items that are not self-supporting, and is more specifically directed to a support that can conform to and accommodate differently sized items.

BACKGROUND OF THE INVENTION

Historically, people have supported plants and other items not capable of supporting themselves by various different methods. For example, during the gardening season, tomato plants are often held up or staked with items such as sticks, pieces of wood, plastic rods, etc. These are often ineffective since the plants require bracing in several different areas which cannot be accommodated by using a single stick or rod. Accordingly, people often resort to using several sticks or rods and tie the plants thereto with string, creating an unsightly and relatively ineffective mass of tangled pieces. One manner by which this problem has been addressed is to use what is referred to as a cage. The cage consists of upstanding pieces of wire cylindrically held together by a series of wire hoops welded thereto. The cages are centered over the plant to be supported such that the plant grows up through the middle of the cage and is supported thereby. The cages are somewhat effective; however, a problem often occurs due to the fact that they are made in a fixed height. When a plant grows beyond the height of the cage, the aforementioned sticks and rods must be resorted to in order to support the uppermost portions of the plant. In addition, over time the cages tend to rust and become unsightly, resulting in the discarding of old cages and purchasing of new ones.

Another problem that occurs with both the use of sticks, rods and cages is that these items cannot be conformed to provide support in precisely the area at which it is needed. Moreover, once these items are positioned, they cannot be readily adjusted to address the changing height and width of the growing plant. Based on the foregoing, it is the general object of the present invention to provide a support that overcomes the drawbacks of the prior art.

It is a more specific object of the present invention to provide a stackable support system that can be adapted to changes in plant height and width.

It is still a further object of the present invention to provide a support system that can be conformed to retain various different items to either prevent them from toppling or to buttress more supple objects.

SUMMARY OF THE INVENTION

The present invention is directed to a stackable support for bracing plants or other items that require additional support to maintain them in their intended orientation. The stackable support includes a primary member having a first and second end and defining a longitudinal axis. At least one retaining arm extends outwardly from the primary member and is located adjacent to the second end. Means are provided for enabling successive stackable supports to be coupled together end to end, thereby allowing a user to create a support having a desired height.

In the preferred embodiment of the present invention, the stackable support includes a pair of retaining arms, each positioned adjacent to the second end of the primary member. In this embodiment, the arms are bendable and can be positioned to conform to any configuration best suited to brace a particular plant or other object. In addition, the ends of each of the retaining arms can be hook shaped such that the arms can be bent and the hooked ends coupled together to form a closed perimeter. Alternatively, successive supports can be hooked together to form a fence-like structure useful in supporting such things as rows of plants.

The means for coupling successive stackable supports together can take the form of a mounting rod projecting outwardly from the second end of the primary member and coaxial therewith. The mounting rod is slidably received in a bore extending from the first end of the primary member partway therethrough and coaxial with the longitudinal axis.

Preferably, the primary member defines a bore extending longitudinally therethrough with the mounting rod and retaining arms being located such that they extend partway into the bore from the second end of the mounting rod. It is also preferable that the mounting rod be formed from a deformable material such as copper, thereby allowing the retaining arms and mounting rod to be crimpingly retained in the bore. It is preferable that all of the components of the present invention be fabricated from copper.

An advantage of the above-described invention is that the supports can be stacked one on top of the other to provide for any desired height, or coupled side-by-side to form a fence-like structure for supporting rows of plants, or the like.

Another advantage of the present invention is that the retaining arms are bendable so that they can be made to conform to any desired configuration and that configuration can be altered as, for example, a plant being braced by the support grows.

Still a further advantage of the present invention is that being fabricated from copper, when used outdoors, the support will weather and oxidize, thereby taking on the aesthetically pleasing green color characteristic of copper.

DETAILED DESCRIPTION OF THE PREFERRED EMBODIMENT

Figure 1:
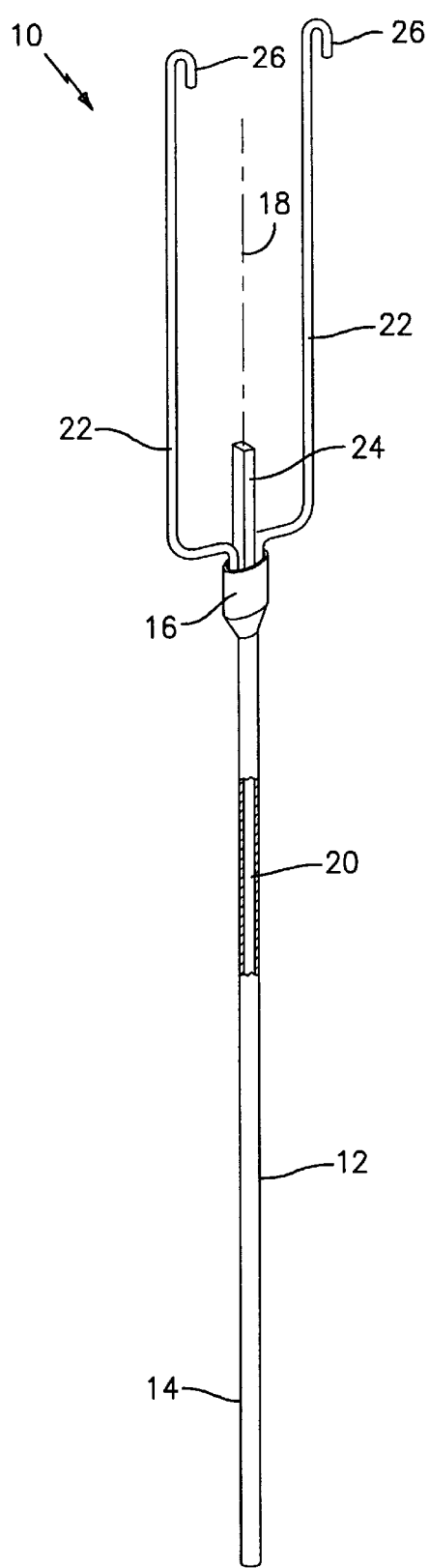
FIG. 1 is a partly in section perspective view showing the stackable support of the present invention.

The present invention is directed to a stackable support generally designated by the reference number 10 that includes a primary member 12 having first and second ends, 14 and 16, respectively. The primary member 12 defines a longitudinal axis 18 and includes a bore 20 extending therethrough. Preferably, the primary member 12 is made from a suitable material such as but not limited to copper tubing. A pair of retaining arms 22 extends outwardly from the second end 18 of the primary member 12.

A mounting rod 24 projects outwardly from the second end 16 of the primary member 12 and is coaxial with the longitudinal axis 18. The mounting rod 24 is adapted to slidably engage the bore 20 in the first end 14 of another stackable support 10. In this manner, successive stackable supports can be slidingly and releasably coupled together to allow a user to create a support having a desired length. While the mounting rod 24 is shown in the illustrated embodiment as having a square cross section, the present invention is not limited in this regard as any cross section, such as round or hexagonal, can be employed without departing from the broader aspects of the present invention.

Figure 2:
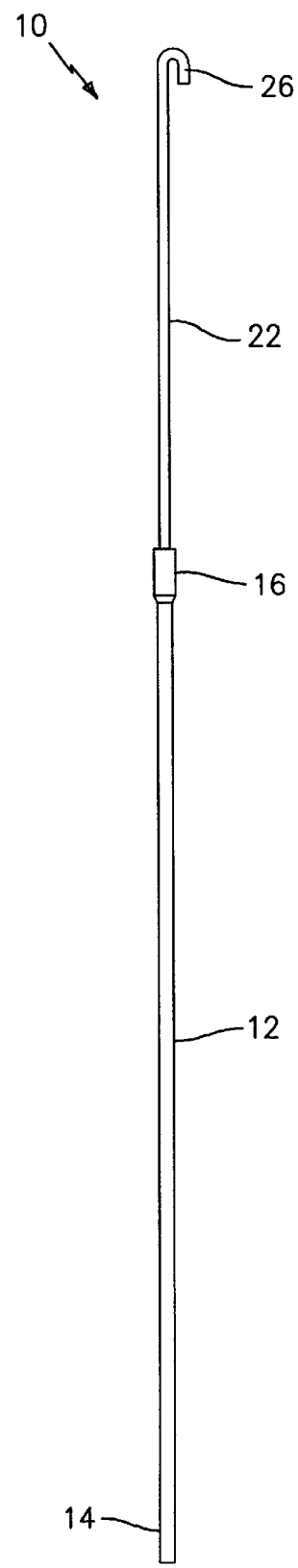
FIG. 2 is a side-elevational view of the stackable support of FIG. 1, showing retaining arms in a bent configuration and having hooked ends.

As shown in FIG. 2, the pair of retaining arms 22 each defines a hooked end 26. The retaining arms 22 are formed from a bendable material such as, but not limited to, copper wire so that they can be moved to conform to any desired configuration and, in addition, the hooked ends 26 of a pair of support arms can be hooked together so that the retaining arms define an enclosed perimeter. The retaining arms 22, as shown in FIG. 2, can be formed from a single piece of bendable material by folding the material and sliding the bent end partway into the bore 20 from the second end 16 of the primary member 12. The mounting rod 24 can also be inserted into the bore 20 from the second end 16 of the primary member 12. To secure the retaining arms 22 and mounting rod 24 in the second end 16 of the primary member 12, the second end of the primary member is deformed so as to crimpingly engage and retain the mounting rod and retaining arms therein. While the present invention has been shown and described as having the retaining arms and the mounting rod crimpingly retained in the bore of the primary member, the invention is not limited in this regard as the mounting rod and/or retaining arms can be attached to the primary member in other ways such as, for example, by welding, soldering, or brazing.

Figure 3:
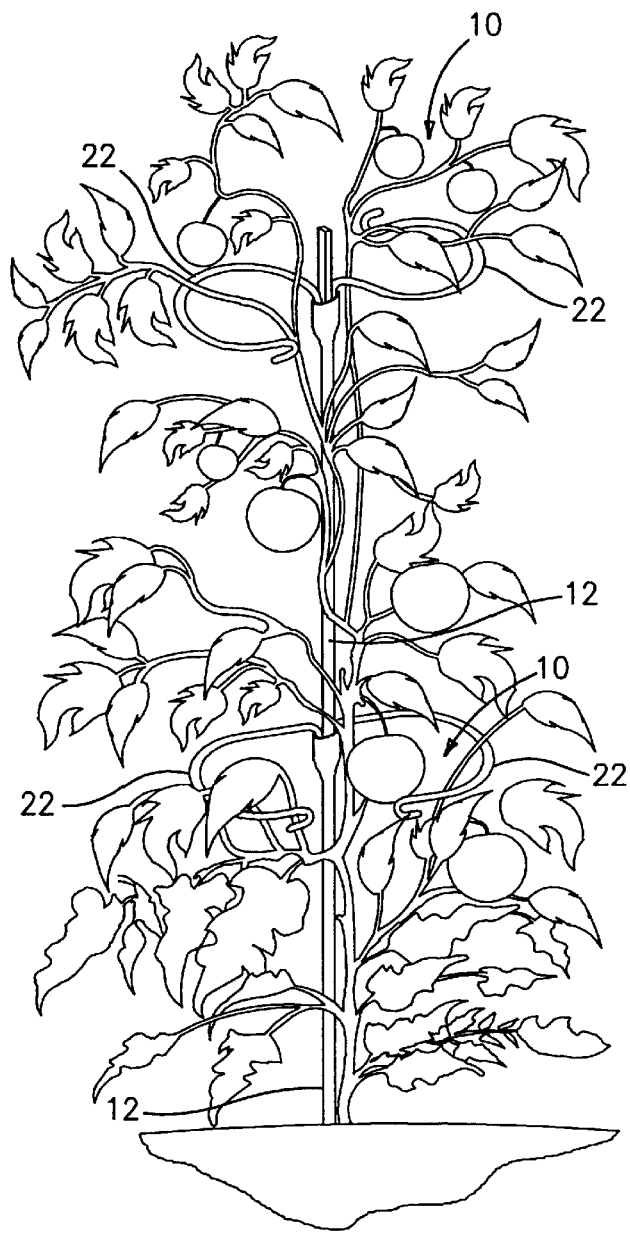
FIG. 3 shows a stackable support bracing a plant.

The operation of the present invention will now be described in connection with supporting a plant, such as a tomato plant. However, the invention is not limited in this regard as it can employed to support any one of a number of items which would require bracing in order to maintain the appropriate position of the item. To use the stackable support 10, the first end 14 of the primary member 12 as shown in FIG. 3 is pushed into the soil adjacent to the plant to be braced. The retaining arms 22 are then bent around the plant in the desired configuration to best support it.

Figure 4:
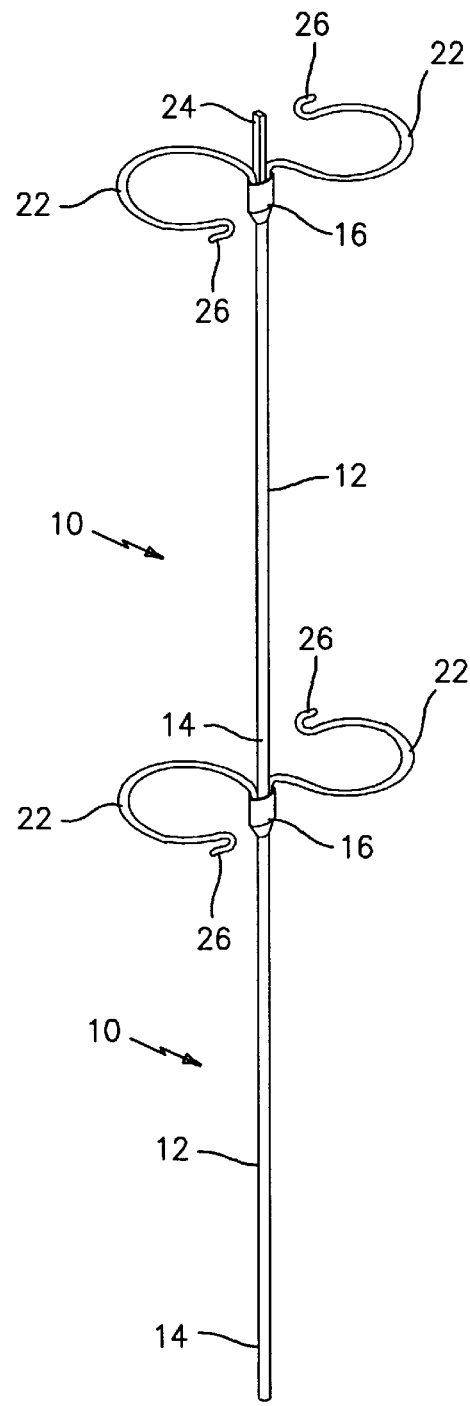
FIG. 4 illustrates a pair of stackable supports positioned one-on-top-of-the-other.
Figure 5:
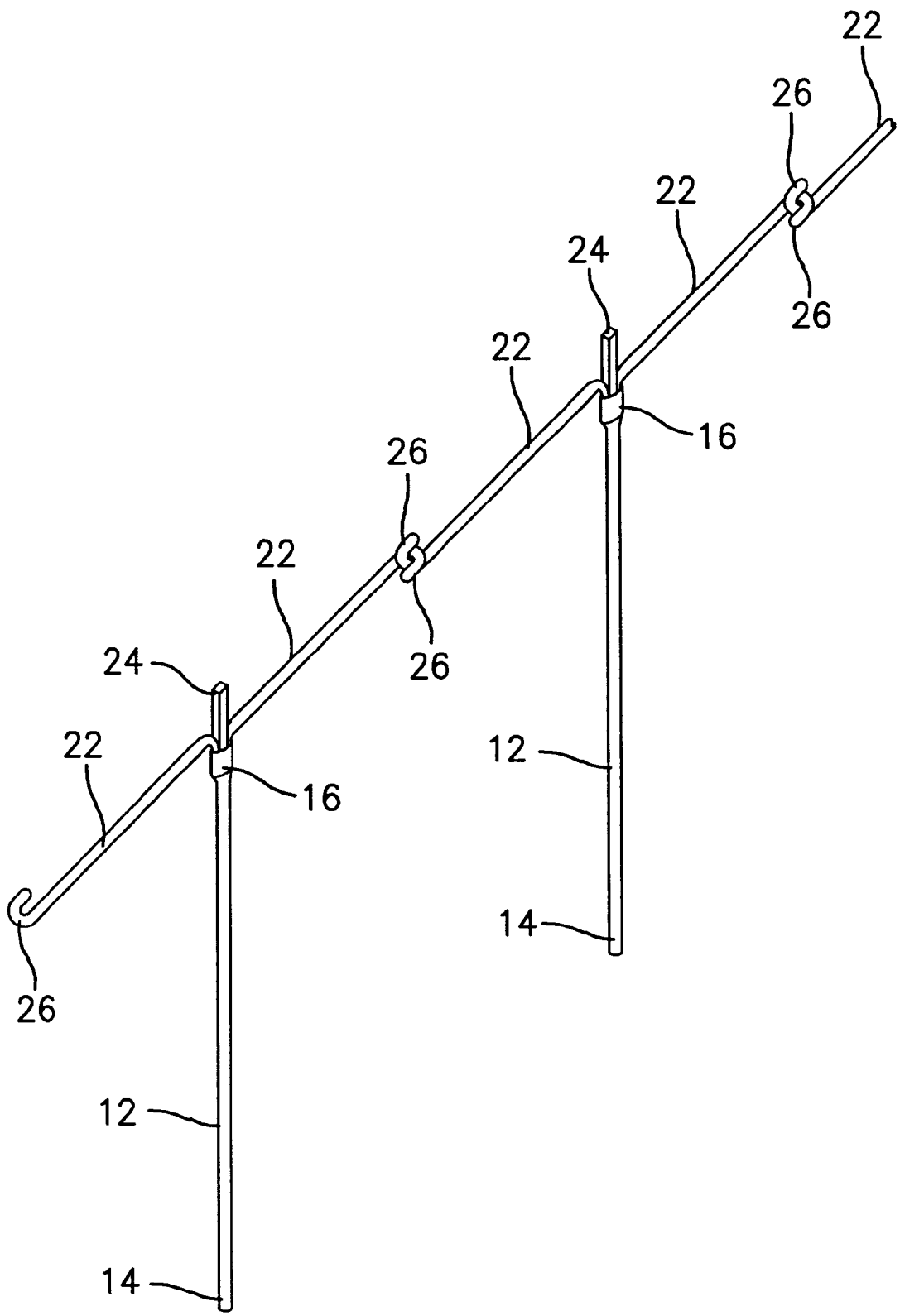
FIG. 5 illustrates successive stackable supports coupled together in a side-by-side relationship thereby forming a fence-like structure.

As the plant grows, and as shown in FIG. 4, successive stackable supports can be coupled together by sliding the mounting rod 24 from one stackable support into the first end 14 of the next successive stackable support. The retaining arms 22 of the next support can then be bent to conform to the shape of the growing plant. In addition, and as shown in FIG. 5, the stackable supports 10 can also be successively hooked together to form a fence-like structure that can support a row of plants or other items.

While preferred embodiments have been shown and described, various modifications and substitutions may be made without departing from the spirit and scope of the invention. Accordingly, it is to be understood that the present invention has been described by way of example, and not by limitation.

What is claimed is:

1. A stackable support for bracing plants or other items incapable of self support, comprising:

an elongated primary member having first and second ends;

at least one retaining arm extending from said primary member adjacent to said second end, said retaining arm being adaptable to engage and brace said plants or other supple items; and engagement means for slidably and releasably mounting said first end of said primary member to a second end of another of said stackable supports, thereby allowing successive supports to be positioned one on top of another to accommodate larger growing plants, or other supple items.

2. A stackable support as defined by claim 1 wherein said at least one retaining arm is bendable so as to conform to a desired shape.

3. A stackable support as defined by claim 2 wherein:

said at least one retaining arm includes a pair of retaining arms, each extending from said primary member adjacent to said second end; and wherein each retaining arm is bendable and defines a hooked end such that said pair of arms can bent and hooked together thereby defining a closed perimeter.

4. A stackable support as defined by claim 1 wherein:

said engagement means includes a mounting rod projecting outwardly from said second end; and wherein said first end of said primary member defines a longitudinal bore extending at least part-way therethrough, said bore being adapted to receive said mounting rod of another stackable support so that successive supports can be positioned one on top of another to buttress larger plants or other supple items.

5. A stackable support as defined by claim 4 wherein said primary member takes the form of a hollow tube.

6. A stackable support as defined by claim 4 wherein:

said primary member is deformable and defines a bore extending longitudinally therethrough; and said retaining arm and said mounting rod each extending partway into said bore from said second end and are retained therein by deforming said second end of said primary member to clampingly engage said retaining arm and said mounting rod.

7. A stackable support as defined by claim 1 wherein said primary member is formed from copper tubing.

8. A stackable support for bracing plants or other supple items, comprising:

a tubular member having first and second ends and defining a longitudinal axis, said tubular member including a bore extending axially therethrough;

a pair of bendable retaining arms projecting outwardly from said tubular member;

a mounting rod extending outwardly from said second end coaxial with said tubular member; and wherein said mounting rod and said retaining arms each extend part way into said bore from said second end and are crimpingly retained therein by said tubular member.

9. A stackable support as defined by claim 8 wherein said tubular member, said retaining arms, and said mounting rod are copper.

\* \* \* \* \*